United States Patent [19]
Riefler et al.

[11] Patent Number: 5,252,939
[45] Date of Patent: Oct. 12, 1993

[54] LOW FRICTION SOLENOID ACTUATOR AND VALVE

[75] Inventors: Roger G. Riefler, Brandon; Kenton L. Durham, Canton, both of Miss.

[73] Assignee: Parker Hannifin Corporation, Cleveland, Ohio

[21] Appl. No.: 951,259

[22] Filed: Sep. 25, 1992

[51] Int. Cl.$^5$ ............................ H01F 3/08; H01F 3/00; H01F 7/08

[52] U.S. Cl. .................................. 335/280; 335/262; 335/261; 251/129.15

[58] Field of Search ............... 335/110, 122, 203, 228, 335/261, 262, 270, 279, 280; 251/129.15

[56] References Cited

U.S. PATENT DOCUMENTS

| | | | |
|---|---|---|---|
| 1,293,052 | 2/1919 | Dinsmoor | 335/262 |
| 2,617,050 | 11/1952 | Weinfurt | |
| 3,788,597 | 1/1974 | Ichioka | 251/129.18 |
| 4,127,835 | 11/1978 | Knutson | 335/266 |
| 4,131,866 | 12/1978 | Torr | 335/262 |
| 4,267,897 | 5/1981 | Takeshima | 335/262 |
| 4,525,695 | 6/1985 | Sheng et al. | |
| 5,051,635 | 9/1991 | Kasahara | 310/80 |

Primary Examiner—Leo P. Picard
Assistant Examiner—Raymond Barrera
Attorney, Agent, or Firm—Ralph E. Jocke

[57] ABSTRACT

An actuator (24) for a valve (10) includes a housing tube (26) enclosing an internal cavity (48). A plunger (42) is mounted for movement in the internal cavity. The plunger includes four slots (50). Rollable spheres (58) are positioned in the slots between staked areas (62). A magnetic field created by electrical current passing through a coil (34) moves the plunger downward to open fluid flow through a control element (20). Flow through the control element enables controlled flow from an inlet (14) to an outlet (16) of the valve. The actuator construction provides for substantial elimination of sliding friction acting on the plunger, reduces hysteresis and the amount of power required to move the plunger, and facilitates accurate control of fluid flow rate through the control element.

11 Claims, 4 Drawing Sheets

4,252,939

LOW FRICTION SOLENOID ACTUATOR AND VALVE

TECHNICAL FIELD

This invention relates to solenoid actuated valves which control the flow of fluid therethrough. Specifically, this invention relates to a solenoid actuator for a valve that has reduced friction and provides accurate positioning of the fluid control element of the valve.

BACKGROUND ART

Prior art solenoid actuators used to control the flow of fluid through a valve are typically of two distinct types. The most common type is a two-position actuator that includes a plunger element that moves between two positions. The plunger is in a first position when no current flows through the coil of the actuator. When an electric current flows through the coil, the plunger element is moved by electromagnetic force to a second position. When the current flow is stopped, the plunger is returned by a spring to its original position. Such "on-off" actuators are commonly used on two position fluid flow control valves.

A second type of solenoid actuator is used in proportional valves. Such actuators include a plunger or other type of movable element that may be selectively moved through a range of positions in response to control signals delivered to the coil of the actuator. Proportional actuators are used in valves that meter the rate of flow.

In both types of prior art solenoid actuators, certain problems exist. The plunger elements used in the actuators are constrained to move in a tubular shaped housing. The magnetic forces that move the plunger element in the desired axial direction, also produce lateral forces. These forces tend to push the plunger against the walls of the housing which increases friction. This frictional resistance increases the amount of force that is required to move the plunger element and correspondingly requires the coil to produce more power to move the plunger.

Another problem with the prior art actuators is that the frictional forces on the plunger element impair accurate positioning of the plunger element, and the flow control elements in the valve to which the plunger element is connected. This is particularly a problem with proportional actuators which exhibit hysteresis. The frictional forces limit the ability of the plunger element to move to the same location in response to identical control signals.

Prior art solenoids have used a technique called "dither" to slightly oscillate the plunger element and reduce friction. However, the problems associated with friction still persist. Others have used ball bearing supports for the plunger element in an attempt to reduce friction, such as the supports shown in U.S. Pat. No. 4,525,695. While this approach has been helpful, the structure of the supports still creates an undesirable level of friction. This is particularly true because the movable element is subjected to sliding friction at one point on each ball bearing despite the existence of the ball bearing type supports.

Thus there exists a need for a solenoid actuator that provides reduced friction, requires less power and achieves more accurate control.

DISCLOSURE OF INVENTION

It is an object of the present invention to provide a solenoid actuator that includes a moveable plunger element having reduced resistance to movement.

It is a further object of the present invention to provide a solenoid actuator that requires less power to move the plunger element.

It is a further object of the present invention to provide a solenoid actuator that enables more accurate positioning of the plunger element and which minimizes hysteresis.

It is a further object of the present invention to provide a solenoid actuated valve that has an actuator that requires less power and achieves more accurate control.

Further objects of the present invention will be made apparent in the following Best Mode for Carrying Out Invention and the appended claims.

The foregoing objects are accomplished in the preferred embodiment by a valve having a body with a fluid inlet and a fluid outlet. A moveable control element is positioned in the body to control the flow of fluid from the inlet to the outlet. The control element has a moveable portion which is moveable in a first linear direction to open flow through the control element. A spring biases the moveable portion of the control element toward a no-flow condition. Of course, in other embodiments the control element may be biased to a full-flow, or an intermediate flow position.

A solenoid actuator of the present invention is attached to the valve. The actuator includes a housing tube having a cylindrical inner wall. The inner wall bounds an internal cavity. An electromagnetic coil is positioned in surrounding relation to the housing tube.

A plunger comprised of magnetic material is mounted for movement inside the plunger tube. The plunger is moveable in the tube in a direction collinear with the moveable portion of the control element. The plunger has a generally cylindrical outer surface that is in close proximity to the inner wall of the housing. Four equally spaced, longitudinally extending slots extend about the outer surface of the plunger. Each of the slots is generally u-shaped but has inwardly tapered portions adjacent an open side of the slot.

Two roller bearings, which serve as rollable bodies, are mounted in each longitudinal slot. A sphere is mounted adjacent each end of the slot and is moveable along a path therein. Staked areas of the slots limit travel of each sphere to a path. The spheres are sized so that a portion of each sphere extends outward from the open side of the slot.

The plunger is mounted inside the housing tube and in the preferred embodiment, is positioned above the control element of the valve. When an electric current flows through the coil, the plunger is moved against the moveable portion of the control element and overcomes the spring biasing the moveable portion towards the closed position. The extent to which the plunger moves the moveable portion of the control element, determines the rate of fluid flow through the valve. Likewise, reducing current flow through the coil enables the biasing means of the control element to move the plunger and to shut off flow through the valve.

Frictional resistance to movement of the plunger is reduced because the spheres roll in contact with both the surfaces of the slots and the inner wall of the housing tube. This eliminates all sliding friction and enables movement of the plunger with less electrical power.

The construction of the actuator of the present invention also enables more accurate and repeatable positioning of the plunger in proportional solenoid actuators.

The present invention may be used successfully with both two position and proportional valves. The invention is also suited for valves that are designed to be normally open or normally closed.

BEST MODE FOR CARRYING OUT INVENTION

Figure 1:
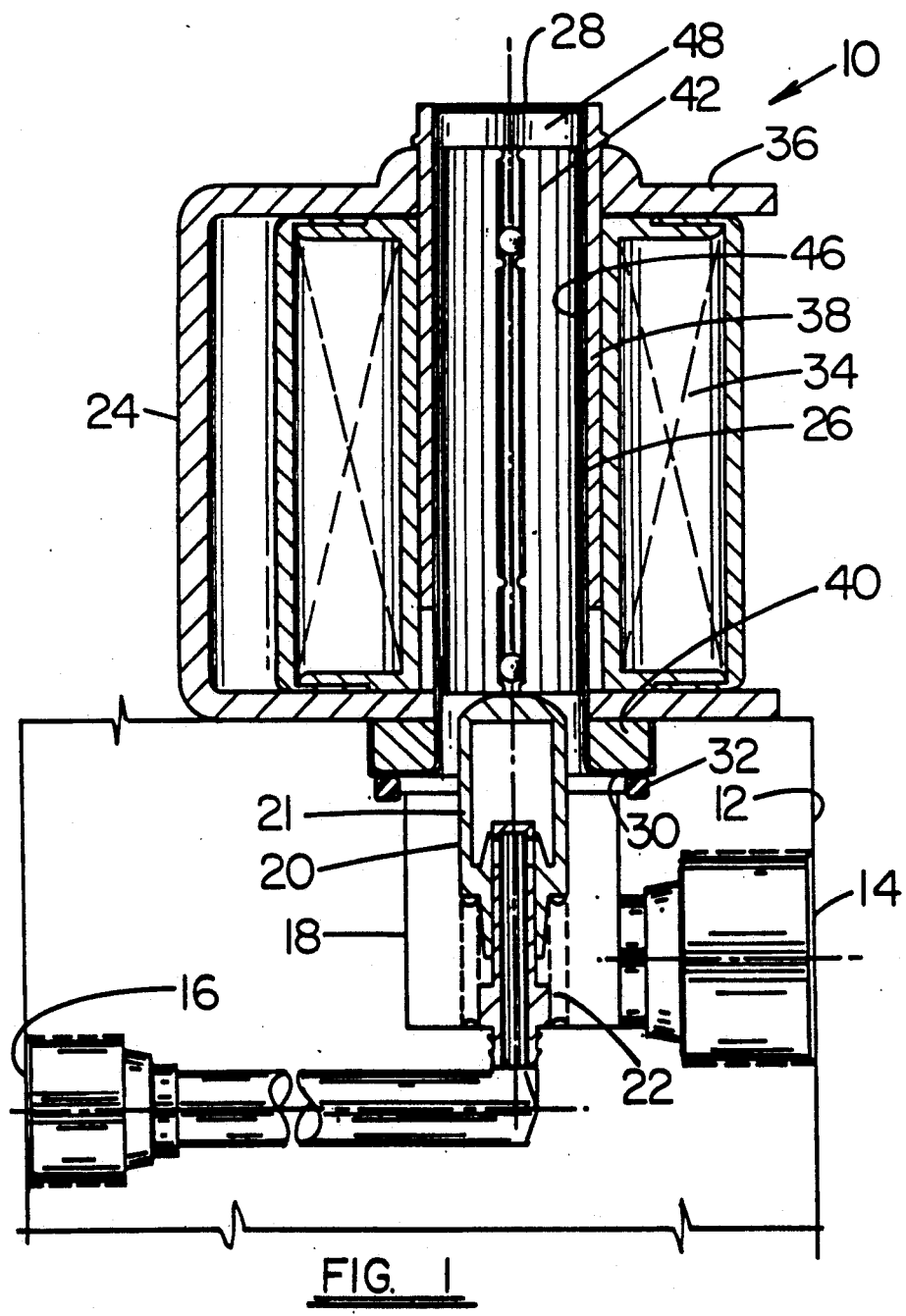
FIG. 1 is a cross sectional view of solenoid actuated valve, incorporating the preferred embodiment of the solenoid actuator of the present invention.
Figure 3:
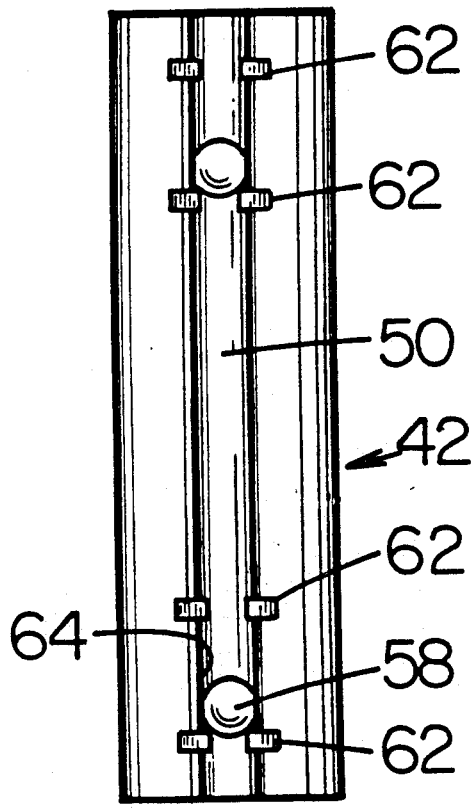
FIG. 3 is a side view of plunger and rollable body assembly.
Figure 2:
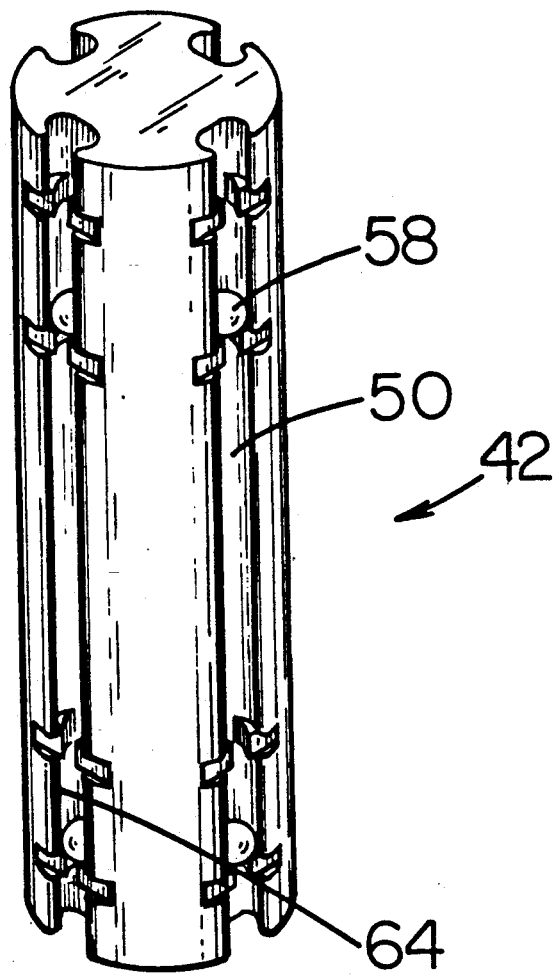
FIG. 2 is a isometric view of the plunger and rollable bodies of the solenoid actuator.
Figure 4:
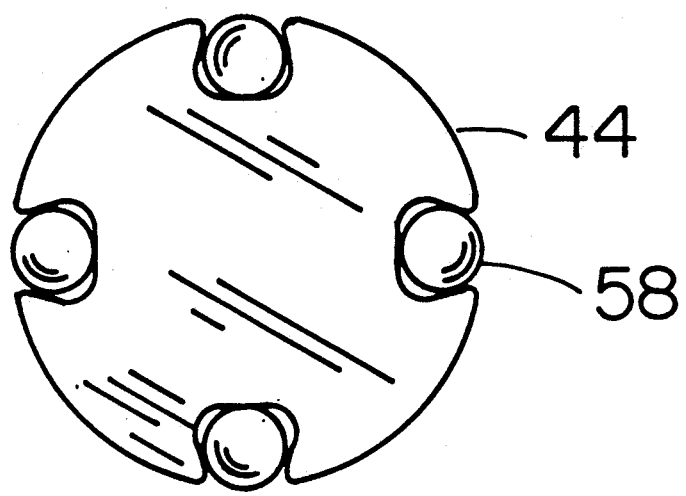
FIG. 4 is a top view of the plunger and rollable body assembly shown in FIG. 3.
Figure 6:
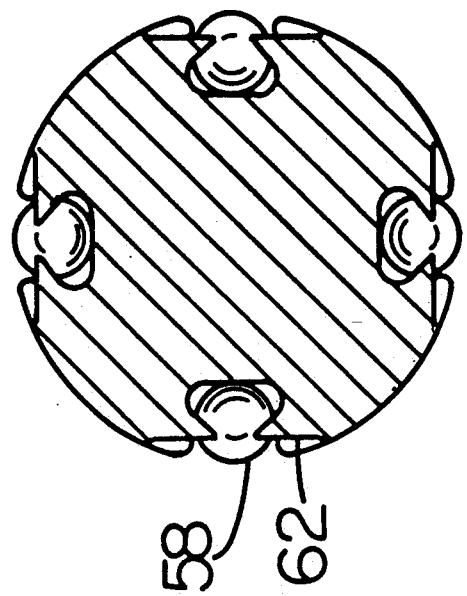
FIG. 6 is a cross sectional view taken along line A—A in FIG. 3.
Figure 5:
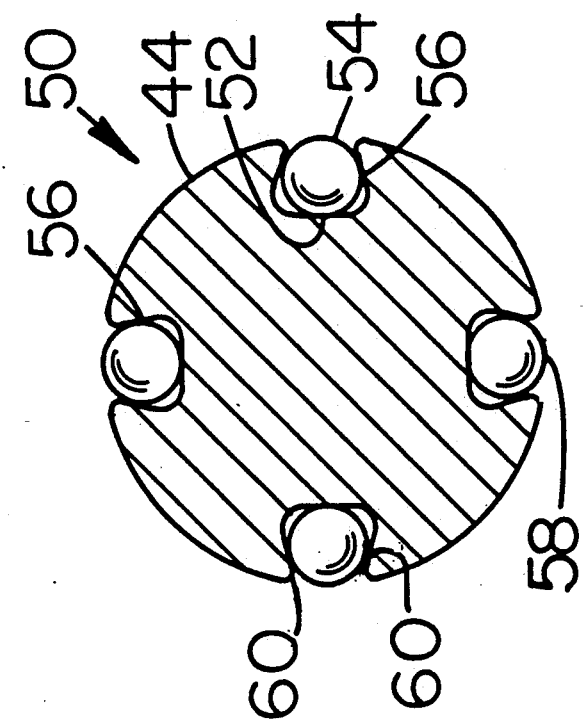
FIG. 5 is a cross sectional view taken along line B—B in FIG. 3.

Referring now to the drawings and particularly to FIG. 1, there is shown therein a solenoid actuated valve generally indicated 10. The valve has a body 12. The body includes an inlet 14 and an outlet 16. The valve body further includes an internal chamber 18 which is in fluid communication with the inlet and the outlet. A control element 20 is positioned in chamber 18 and controls the flow of fluid from the inlet to the outlet of the valve. In the preferred embodiment of the valve, control element 20 has a moveable portion 21 that is biased upward by a spring 22 as shown in FIG. 1.

Control element 20 is configured so that when moveable portion 21 is positioned fully upward as shown in FIG. 1, flow through the valve is prevented. Movement of the moveable portion 21 in the downward direction against the force of spring 22, enables fluid flow from the inlet to the outlet of the valve. In the preferred embodiment, the valve shown in FIG. 1 is used to control the flow of a refrigerant material through the valve. Of course in other embodiments of the invention, the flow of other types of fluid may be controlled or other types of control elements may be used. The invention is equally well suited for use with proportional valves and two position valves, as well as valves that are normally open or normally closed.

A solenoid actuator 24 is fixably mounted on body 12. Actuator 24 includes a cylindrical housing tube 26 which is closed at its upper end 28. The open lower end of the housing tube includes an outward extending flange portion 30. Flange portion 30 nests in a recess in body 12. A seal 32 is positioned under flange portion 30 and serves to hold housing tube 26 in sealed relation with chamber 18. In the preferred embodiment of the invention, housing tube 26 is made from non-magnetic material.

Actuator 24 further includes a coil 34 supported in a frame 36. Coil 34 is bounded inwardly by a sleeve member 38 that extends to the upper end of housing tube 26. Coil 34 surrounds housing tube 26. A flux washer 40 is positioned under frame 36 in the recess in body 12, above flange portion 30. In the preferred form of the invention, frame 36, sleeve member 38 and flux washer 40 are made from magnetic material.

A plunger 42 is positioned in housing tube 26. As shown in FIGS. 2 through 6, plunger 42 is generally circular in cross section and has a cylindrical outer surface 44. Outer surface 44 is sized to be slightly spaced from cylindrical inner wall 46 that bounds an internal cavity 48 inside housing tube 26. Plunger 42 is longitudinally moveable inside housing tube 26, and the lower end of plunger 42, as shown in FIG. 1, is in abutting contact with the moveable portion 21 of control element 20.

The outer surface 44 of plunger 42 includes four equally spaced longitudinally extending slots 50. In cross section, slots 50 have a closed side 52 and an open side 54. Slots 50 are further bounded in cross section by side walls 56. (See FIG. 5).

Spheres 58, which serve as rollable bodies, are mounted in slots 50 adjacent each end of plunger 42. Spheres 58 are sized so that they extend from open side 54 of the slots. Inwardly tapered portions 60 of side walls 56, prevent spheres 58 from moving out of slots 50. Spheres 58 are sized so that when plunger 42 is positioned in internal cavity 48 of housing tube 36, the spheres 58 are in contact with the inner wall 46 of the housing tube. In the preferred form of the invention, the plunger 42 is made from magnetic material and spheres 58 are made from non-magnetic material.

Slots 50 in plunger 42, include staked areas 62. Staked areas 62 serve to limit the travel of spheres 58 to paths 64 which extend between the staked areas. The staked areas prevent spheres 58 from falling out of the slots 50 when the plunger is being installed or removed from inside the housing tube 26. The staked areas also insure that the spheres are positioned in the slots so that the plunger 42 cannot cock, tilt or otherwise move so that its outer surface 44 comes into contact with inner wall 46 of the housing tube.

Although the preferred embodiment of the actuator of the present invention has four equally spaced slots, other embodiments of the invention may have three slots. Further alternative embodiments may include more than four slots. Such embodiments would perform satisfactorily as long as the rollable bodies prevented contact between the wall of the plunger and its enclosure.

In operation of the actuator and valve, electric current is supplied through the coil 34 to create an electromagnetic field. The magnetic force causes plunger 42 to move downward in proportion to the force of the field. The force of the plunger overcomes the opposing force of spring 22 and moves the moveable portion 21 of the control element. Movement of moveable portion 21 downward, enables flow through the valve from the inlet to the outlet. The amount of fluid flow through the valve is proportional to the displacement of the moveable portion 21 of the control element by the plunger. Reducing the current through coil 34 reduces the magnetic force on plunger 42 and enables spring 22 to move the control element toward the closed position.

A fundamental advantage of the present invention is that the plunger is able to move with virtually no friction. This is achieved because spheres 58 roll on inner wall 46 and the bottom of the slots as the plunger moves. This avoids sliding friction.

The dramatic reduction in sliding friction achieved by the present invention reduces the amount of force that is required to move the plunger to open and close the valve. This feature is of great value in both proportional and two-position actuators. It also enables a proportional actuator to more accurately position the plunger, because the plunger will move to the same position (and thus open a valve the same amount) in response to a given control current applied through the coil. The reduced friction greatly enhances the control capability of the actuator and reduces hysteresis.

Thus, the low friction solenoid actuator and valve of the present invention achieves the above stated objectives, eliminates difficulties encountered in the use of prior devices, solves problems and attains the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations given are by way of examples and the invention is not limited to the exact details shown or described.

Having described the features, discoveries and principles of the invention, the manner in which it is utilized, and the advantages and useful results obtained; the new and useful structures, devices, elements, arrangements, parts, combinations, systems, equipment, operations, methods and relationships are set forth in the appended claims.

I claim:

1. A solenoid actuator, comprising:
a housing tube, said housing tube having an inner wall bounding an internal cavity;
magnetic coil means adjacent and in surrounding relation of said tube for producing a magnetic field in an area of said tube in response to electrical energization of said coil means; and
a plunger mounted for longitudinal movement in said area of said tube, said plunger bounded by an outer surface extending generally adjacent the inner wall of said tube, said plunger comprised of magnetic material and longitudinally movable in said tube responsive to said magnetic field produced by said coil means,
a plurality of longitudinally extending slots in the outer surface of said plunger,
a plurality of rollable bodies mounted for movement along said slots, said rollable bodies in supporting contact with said plunger and said housing tube.

2. The solenoid actuator according to claim 1 wherein said tube and said plunger are generally circular in cross section, and said slots are angularly disposed from each other about said outer surface of said plunger, whereby contact between said inner wall of said tube and said outer surface of said plunger is prevented.

3. The solenoid actuator according to claim 2 wherein said rollable bodies are spheres, and wherein said slots in cross section have an open side, a closed side and a pair of side walls; said side walls including inwardly tapered portions adjacent said open side, and wherein said spheres extend radially outward through said open side but are prevented from passing out of said slot through said open side.

4. The solenoid according to claim 3 wherein each of said slots extend longitudinally the full length of said plunger.

5. The solenoid actuator according to claim 4 wherein said plunger further includes staked areas of said slots, and wherein travel of said spheres is limited to paths extending between said staked areas.

6. The solenoid actuator according to claim 5 wherein each said slot includes a plurality of paths each housing a sphere.

7. The solenoid actuator according to claim 6 wherein said plunger includes a pair of paths in each slot, a path in each slot extending adjacent each longitudinal end of said plunger.

8. The solenoid actuator according to claim 7 wherein said plunger has at least 3 opposed slots, said slots radially spaced equally about said plunger.

9. A solenoid actuator comprising:
a housing tube, said housing tube having an inner wall bounding an internal cavity;
magnetic coil means adjacent said tube for producing a magnetic field in response to electrical energization of said coil means; and
a plunger mounted for longitudinal movement in said tube, said plunger bounded by an outer surface extending generally adjacent the inner wall of said tube, said plunger comprises of magnetic material and longitudinally movable in said tube responsive to said magnetic field produced by said coil means, a plurality of longitudinally extending slots in the outer surface of said plunger;
a plurality of rollable bodies mounted for movement along said slots, said rollable bodies disposed longitudinally always separated from each other and in supporting contact with said plunger and sad housing tube.

10. The solenoid actuator according to claim 9 wherein said plunger moves longitudinally in said tube between first and second positions, and wherein said slots include preventing means for preventing passage of said rollable bodies out of said slots in the longitudinal direction, and wherein said bodies move in said slots as said plunger moves between said first and second positions without engaging said preventing means.

11. The solenoid actuator according to claim 10 wherein said preventing means comprises staked areas of said slots.

* * * * *